US012749950B2

(12) United States Patent
Choi

(10) Patent No.: US 12,749,950 B2
(45) Date of Patent: Sep. 29, 2026

(54) MOTOR INCLUDING CONNECTOR WITH SHIELD TERMINAL CONTACTING A COVER

(71) Applicant: LG INNOTEK CO., LTD., Seoul (KR)

(72) Inventor: Dae Ho Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 269 days.

(21) Appl. No.: 18/705,914

(22) PCT Filed: Nov. 18, 2022

(86) PCT No.: PCT/KR2022/018285

§ 371 (c)(1),
(2) Date: Apr. 29, 2024

(87) PCT Pub. No.: WO2023/120998

PCT Pub. Date: Jun. 29, 2023

(65) Prior Publication Data

US 2026/0142534 A1 May 21, 2026

(30) Foreign Application Priority Data

Dec. 22, 2021 (KR) ........................ 10-2021-0185012

(51) Int. Cl.
*H02K 5/16* (2006.01)
*H02K 5/22* (2006.01)
(Continued)

(52) U.S. Cl.
CPC ............. *H02K 11/01* (2016.01); *H02K 5/161* (2013.01); *H02K 5/225* (2013.01); *H02K 7/083* (2013.01); *H02K 11/40* (2016.01)

(58) Field of Classification Search
CPC ........ H02K 5/15; H02K 5/161; H02K 5/1732; H02K 5/225; H02K 7/085; H02K 11/01; H02K 11/0141; H02K 11/40; H02K 7/083
See application file for complete search history.

(56) References Cited

U.S. PATENT DOCUMENTS 4,384,223 A * 5/1983 Zelt ........................ H02K 5/225 310/71
11,108,306 B2 8/2021 Shim et al.
(Continued)

FOREIGN PATENT DOCUMENTS

JP 6435697 B2 12/2018
KR 20170032663 A * 3/2017 ............ H02K 5/225
(Continued)

OTHER PUBLICATIONS

Lin, Machine Translation of KR20170032663, Mar. 2017 (Year: 2017).*

*Primary Examiner* — Eric Johnson
(74) *Attorney, Agent, or Firm* — Birch, Stewart, Kolasch & Birch, LLP

(57) ABSTRACT

Disclosed in an embodiment is a motor comprising: a housing; a cover disposed at the top of the housing; a stator disposed inside the housing; a rotor disposed inside the stator; a shaft coupled to the rotor; and a connector disposed at the upper portion of the cover, wherein the connector includes a connector body, and a shield terminal disposed at the connector body, the cover is made from a metal material, the shield terminal includes: a plate part; a support part extending from one side of the plate part; an inclined part extended to be inclined from the end portion of the support part; and a first protrusion and a second protrusion, which protrude from the end portion of the inclined part while being spaced from each other, and the first protrusion and the second protrusion are in contact with the cover. Therefore, the motor has the shield terminal designed such that the two protrusions formed on the shield terminal have different contact reaction forces, and thus the ground force and durability of the shield terminal can be improved.

15 Claims, 13 Drawing Sheets

(51) Int. Cl.

| | |
|---|---|
| ***H02K 7/08*** | (2006.01) |
| ***H02K 11/01*** | (2016.01) |
| ***H02K 11/40*** | (2016.01) |

(56) References Cited

U.S. PATENT DOCUMENTS

2010/0323552 A1* 12/2010 Chaumet ................ H02K 11/40
439/426
2017/0279330 A1* 9/2017 Willner .................. H02K 5/161
2019/0199175 A1* 6/2019 Kanazawa ............. B62D 5/046
2021/0265899 A1* 8/2021 Yamada ............... B62D 5/0403

FOREIGN PATENT DOCUMENTS

KR 10-2226263 B1 3/2021
KR 10-2250167 B1 5/2021
KR 10-2021-0087325 A 7/2021

* cited by examiner

MOTOR INCLUDING CONNECTOR WITH SHIELD TERMINAL CONTACTING A COVER

CROSS REFERENCE TO RELATED APPLICATIONS

This application is the National Phase of PCT International Application No. PCT/KR2022/018285, filed on Nov. 18, 2022, which claims priority under 35 U.S.C. 119(a) to Patent Application No. 10-2021-0185012, filed in the Republic of Korea on Dec. 22, 2021, all of which are hereby expressly incorporated by reference into the present application.

TECHNICAL FIELD

Embodiments relate to a motor.

BACKGROUND ART

Motors are apparatuses configured to convert electrical energy to mechanical energy to obtain rotational forces and are widely used for vehicles, home appliances, industrial machines, and the like.

Particularly, the motor may be applied to an active roll stabilizer (ARS). In this case, the ARS may be a device which adjusts a stabilizer bar to improve safety and ride comfort. Specifically, the ARS may be a device which adjusts a degree of torsion of the stabilizer to improve turning safety of the vehicle when a vehicle is turned.

The motor may include a housing, a shaft, a stator disposed on an inner circumferential surface of the housing, a rotor installed on an outer circumferential surface of the shaft, a busbar disposed on the stator, and the like. In this case, the stator induces an electrical interaction with the rotor to induce rotation of the rotor.

In this case, the motor may be grounded using a wire or the like. However, when the separate wire or the like is used, there is a risk of disconnection, interference between the wire and other components of the motor may occur. Accordingly, the motor may include a shield terminal to be grounded. In this case, the shield terminal may be a ground terminal provided to reduce noise against sensing when the sensing for electronic controlling is performed.

In this case, the shield terminal may be formed of a low resistance material such as gold, silver, or copper. However, since the gold, silver, copper, or the like is material having ductility, an additional fixing method or structure is required.

Therefore, there is a demand for a structurally improved shield terminal to secure contactability of the shield terminal without a separate fixing structure.

DISCLOSURE

Technical Problem

Embodiments are directed to providing a motor including a shield terminal with improved groundability and durability.

Objectives to be solved by the present invention are not limited to the above-described objectives, and other objectives which are not described above will be clearly understood by those skilled in the art through following descriptions.

Technical Solution

A motor includes a housing, a cover disposed at an upper portion of the housing, a stator inside the housing, a rotor disposed inside the stator, a shaft coupled to the rotor, and a connector disposed at an upper portion of the cover, wherein the connector includes a connector body, and a shield terminal disposed on the connector body, the cover is made of a metal material, the shield terminal includes a plate part, a support extending from one side of the plate part, an inclined part extending to be inclined from an end portion of the support, and a first protrusion and a second protrusion that protrude to be spaced apart from each other from an end portion the inclined part, and the first protrusion and the second protrusion are in contact with the cover.

Here, the support may be disposed inside the connector body. In addition, the connector body may include a body portion disposed at the upper portion of the cover, and a connector portion formed to protrude in an axial direction from the body portion, the support may include a first area formed to extend downward from an outer surface of the plate part, and a second area extending in a horizontal direction from a lower side end portion of the first area, the first area may be disposed inside the connector portion, and the second area may be disposed inside the body portion.

In addition, with respect to a virtual plane, the first protrusion and the second protrusion may be disposed on the inclined part to have a predetermined height difference. In addition, a lower side edge of the first protrusion and a lower side edge of the second protrusion may be disposed on a virtual line (L), and the line (L) may form a predetermined inclination angle (θ) with respect to the plane. Here, the plane may be provided as an upper surface of the cover.

Meanwhile, the cover may include a cover body, a first cover protrusion extending to protrude upward of axial directions from an outer circumference of the cover body, and a second cover protrusion extending to protrude downward of the axial directions from the cover body, and a bearing may be disposed inside the second cover protrusion.

Advantageous Effects

According to embodiments, by designing a shield terminal so that contact reaction forces of two protrusions formed on the shield terminal is formed differently, it is possible to increase the grounding power and durability of the shield terminal.

According to the embodiments, it is possible to increase the grounding ability between a first protrusion, a second protrusion, and a cover of the shield terminal using a coupling strength between the cover and a connector. In other words, by implementing two-point contact using the two protrusions, it is possible to increase the grounding ability.

According to the embodiments, it is possible to make a reaction force generated by the first protrusion and a reaction force generated by the second protrusion different using a height difference between the first protrusion and the second protrusion. Therefore, the amount of wear generated by the first protrusion and the amount of wear generated by the second protrusion are different, and it is possible to secure the grounding durability of the motor through such a difference in the amount of wear.

Various useful advantages and effects of the embodiments are not limited the above-described content and may be more easily understood while the specific embodiments are described.

MODE FOR INVENTION

Figure 1:
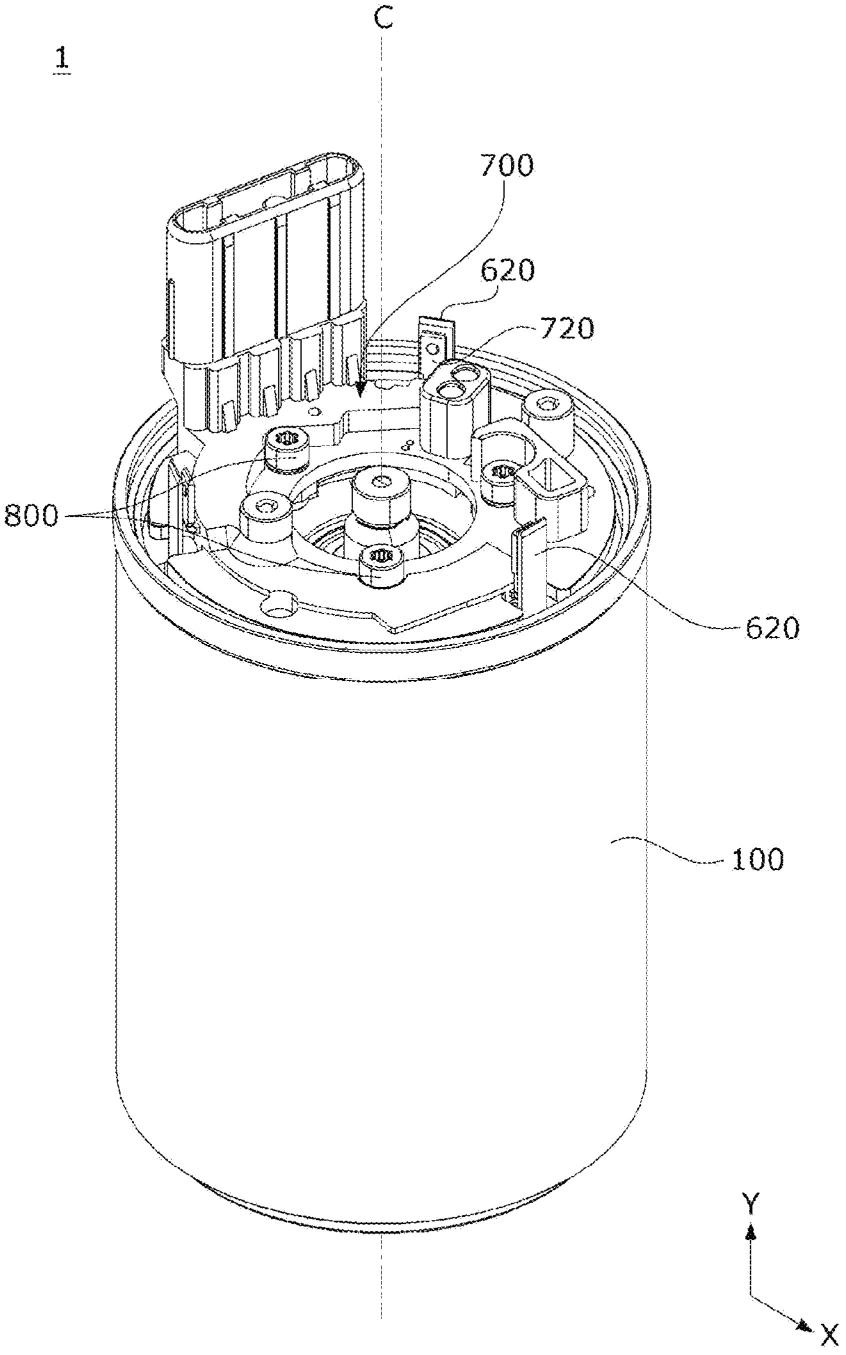
FIG. 1 is a perspective view showing a motor according to an embodiment.

Hereinafter, exemplary embodiments of the present invention will be described in detail with reference to the accompanying drawings.

However, the technical spirit of the present invention is not limited to some embodiments which will be described and may be embodied in a variety of different forms, and at least one or more components of the embodiments may be selectively combined, substituted, and used within the range of the technical spirit.

In addition, unless clearly and specifically defined otherwise by the context, all terms (including technical and scientific terms) used herein can be interpreted as having meanings customarily understood by those skilled in the art, and meanings of generally used terms, such as those defined in commonly used dictionaries, will be interpreted in consideration of contextual meanings of the related art.

In addition, the terms used in the embodiments of the present invention are considered in a descriptive sense only and not to limit the present invention.

In the present specification, unless clearly indicated otherwise by the context, singular forms include the plural forms, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and the essence, order, and the like of the elements are not limited by the terms.

In addition, it should be understood that, when an element is referred to as being "connected" or "coupled" to another element, such a description may include both a case in which the element is directly connected or coupled to another element, and a case in which the element is connected or coupled to another element with still another element disposed therebetween.

In addition, when any one element is described as being formed or disposed "on" or "under" another element, such a description includes both a case in which the two elements are formed or disposed in direct contact with each other and a case in which one or more other elements are interposed between the two elements. In addition, when one element is described as being formed "on or under" another element, such a description may include a case in which the one element is formed at an upper side or a lower side with respect to another element.

Hereinafter, example embodiments of the invention will be described in detail with reference to the accompanying drawings. Components that are the same or correspond to each other will be denoted by the same reference numerals regardless of the figure numbers, and redundant descriptions will be omitted.

Figure 2:
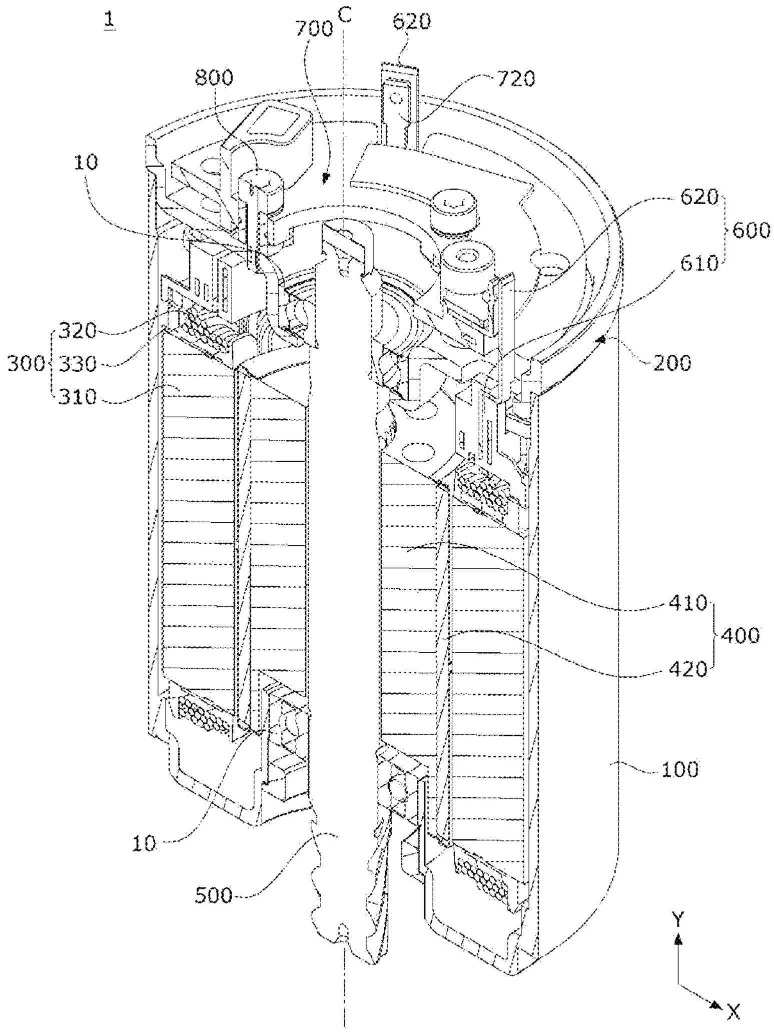
FIG. 2 is a cross-sectional perspective view showing the motor according to the embodiment.
Figure 3:
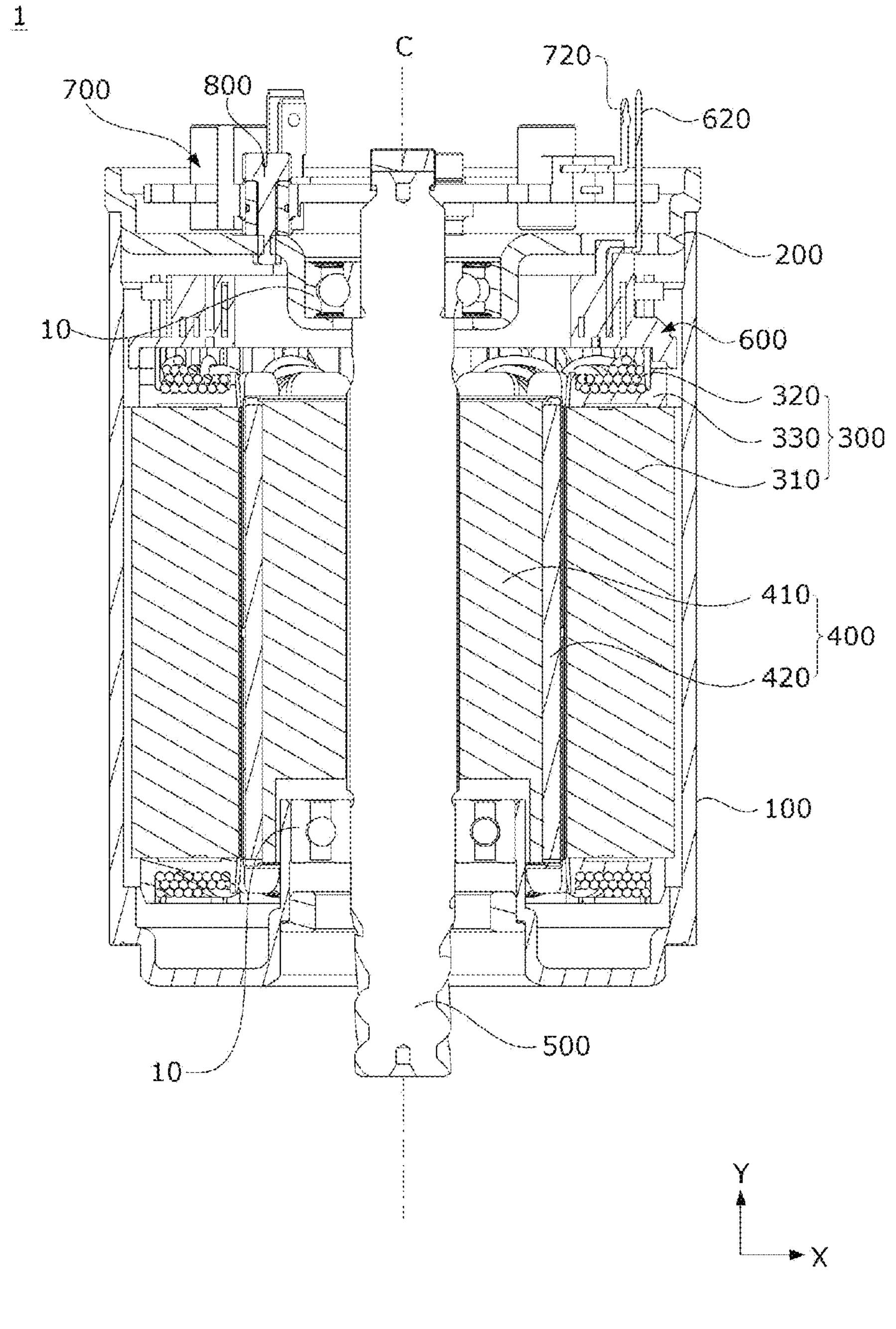
FIG. 3 is a cross-sectional view showing the motor according to the embodiment.
Figure 4:
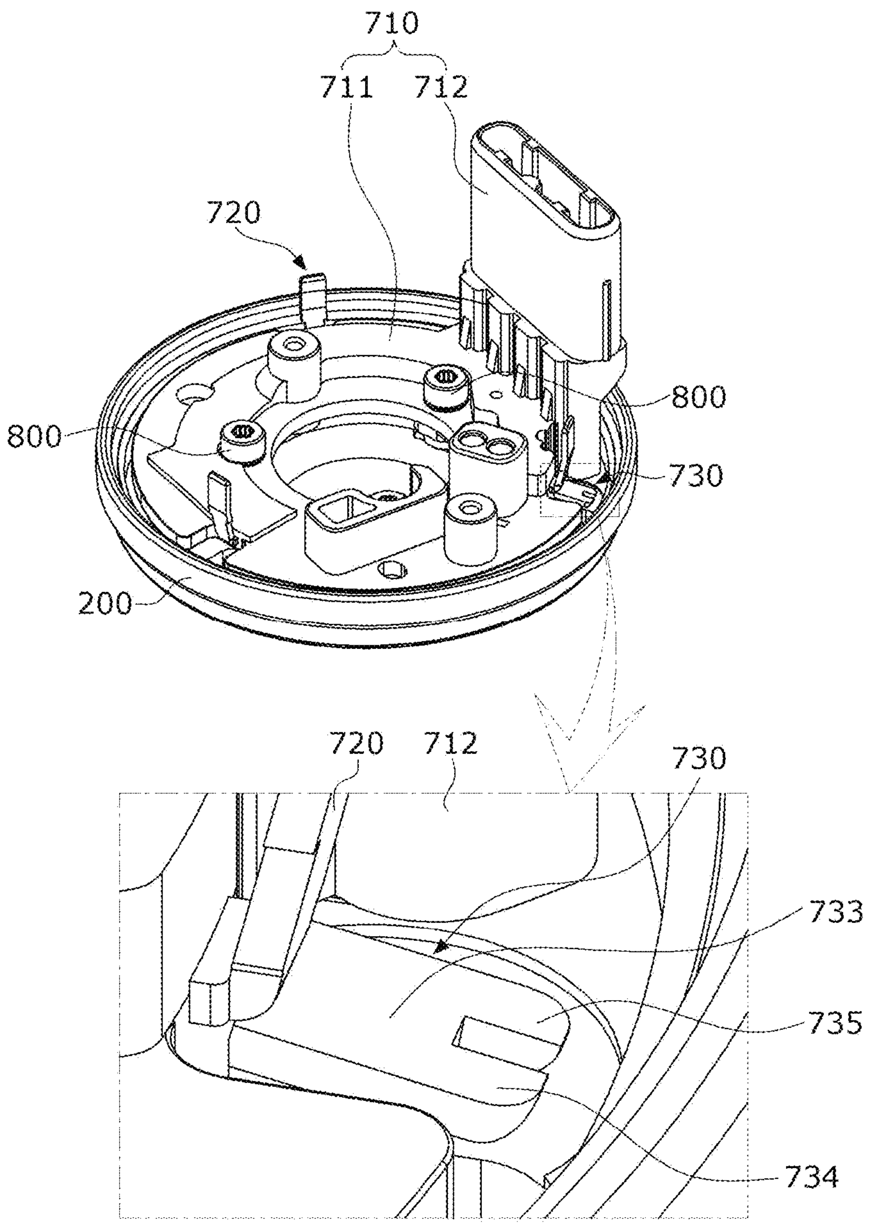
FIG. 4 is a perspective view showing a cover, a connector, and a fastening member that are disposed in the motor according to the embodiment.
Figure 5:
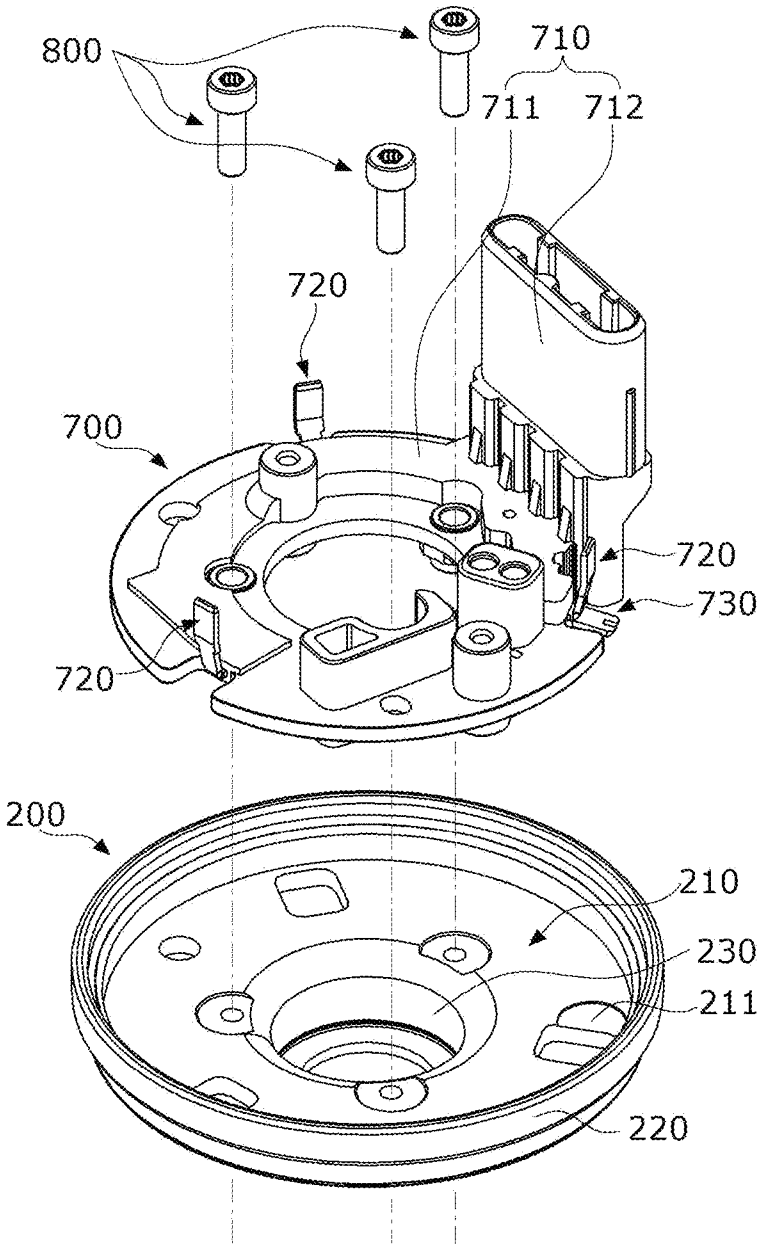
FIG. 5 is an exploded perspective view showing the cover, the connector, and the fastening member that are disposed in the motor according to the embodiment.
Figure 6:
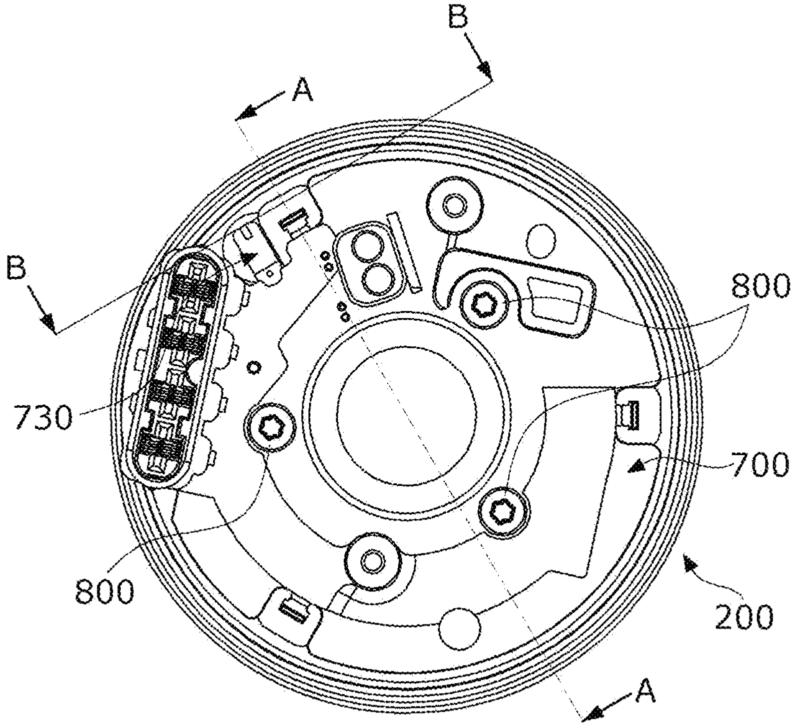
FIG. 6 is a plan view showing the cover, the connector, and the fastening member that are disposed in the motor according to the embodiment.
Figure 7:
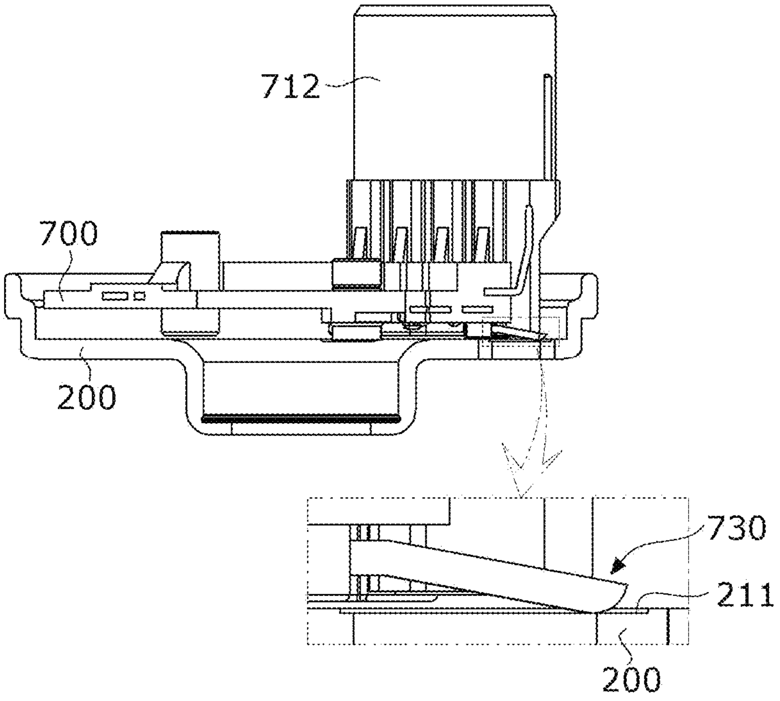
FIG. 7 is a cross-sectional view along line A-A in FIG. 6.
Figure 8:
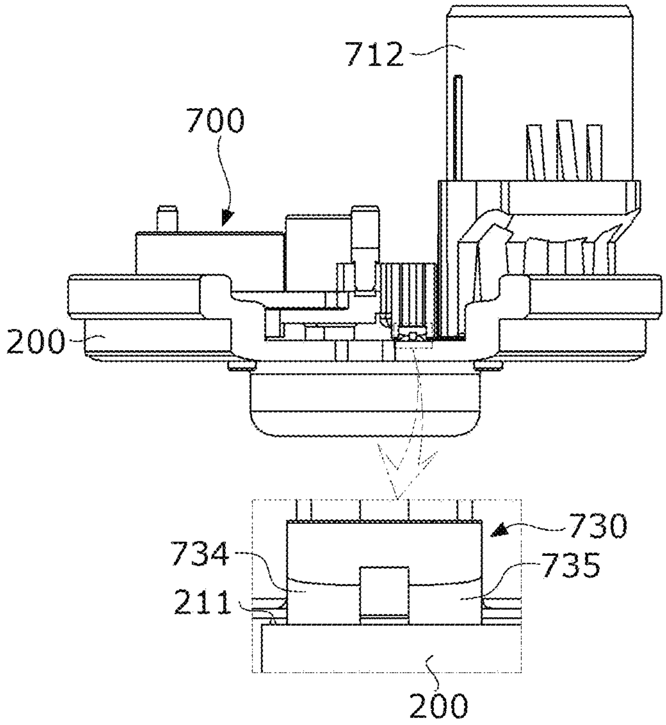
FIG. 8 is a cross-sectional view along line B-B in FIG. 6.

FIG. 1 is a perspective view showing a motor according to an embodiment, FIG. 2 is a cross-sectional perspective view showing the motor according to the embodiment, FIG. 3 is a cross-sectional view showing the motor according to the embodiment, FIG. 4 is a perspective view showing a cover, a connector, and a fastening member that are disposed in the motor according to the embodiment, FIG. 5 is an exploded perspective view showing the cover, the connector, and the fastening member that are disposed in the motor according to the embodiment, FIG. 6 is a plan view showing the cover, the connector, and the fastening member that are disposed in the motor according to the embodiment, FIG. 7 is a cross-sectional view along line A-A in FIG. 6, and FIG. 8 is a cross-sectional view along line B-B in FIG. 6.

Here, an X direction shown in FIGS. 1 to 3 may indicate a radial direction or a first direction, and a Y direction may indicate an axial direction or a second direction. In addition, the axial direction may be perpendicular to the radial direction. In addition, a direction along a circle with a radial radius with respect to the center of axis may be referred to as a circumferential direction. In addition, the reference numeral "C" shown in FIGS. 1 to 3 may denote the center of rotation (center of axis).

Referring to FIGS. 1 to 3, a motor 1 according to an embodiment may include a housing 100 having an opening formed at one side thereof, a cover 200 disposed at an upper portion of the housing 100 to cover the opening, a stator 300 disposed inside the stator 300, a rotor 400 disposed inside the stator 300, a shaft 500 rotating with the rotor 400, a bus bar 600 disposed above the stator 300, a connector 700 disposed at an upper portion of the cover 200, and a fastening member 800 that couples the cover 200 with the connector 700. Here, the inside may indicate a direction disposed toward the center C with respect to the center C, and the outside may indicate a direction opposite to the inside.

The motor 1 may be a motor used in an active roll stabilizer (ARS).

The housing 100, the cover 200, and the connector 700 may form the appearance of the motor 1. In addition, an accommodation space may be formed by coupling the housing 100 with the cover 200. Therefore, the stator 300, the rotor 400, the shaft 500, and the like may be disposed in the accommodation space as shown in FIGS. 2 and 3. In this case, the shaft 500 is rotatably disposed in the accommodation space. Therefore, the motor 1 may further include a bearing 10 disposed on each of upper and lower portions of the shaft 500.

The housing 100 may be formed in a cylindrical shape. In addition, the housing 100 may accommodate the stator 300, the rotor 400, and the like therein. In this case, a shape or material of the housing 100 may be changed variously. For example, the housing 100 may be made of a metal material capable of withstanding high temperatures.

The cover 200 may be disposed on an opening surface of the housing 100, that is, an upper portion of the housing 100 to cover the opening of the housing 100. Here, the cover 200 may be made of a metal material.

Referring to FIG. 5, the cover 200 may include a cover body 210, a first cover protrusion 220, and a second cover protrusion 230. Here, the cover body 210, the first cover protrusion 220, and the second cover protrusion 230 may be formed integrally.

The cover body 210 may serve as a cover that covers the opening of the housing 100. Therefore, the cover body 210 may be disposed on the opening surface of the housing 100, that is, the upper portion of the housing 100.

In addition, one side of the shield terminal 730 may be in contact with an upper surface 211 of the cover body 210.

The first cover protrusion 220 may be formed to protrude upward, which is one of the axial directions, from an outer circumference or edge of the cover body 210. Therefore, the first cover protrusion 220 may guide the connector 700.

The second cover protrusion 230 may be formed to protrude downward, which is the other direction of the axial directions, from a central side of the cover body 210. Therefore, the bearing 10 may be disposed inside the second cover protrusion 230. Here, the second cover protrusion 230 may be referred to as a bearing accommodating part or a cover pocket part. In addition, the second cover protrusion 230 may include a hole formed in a central portion to arrange the shaft 500.

The stator 300 may be disposed inside the housing 100. In this case, the stator 300 may be supported by an inner circumferential surface of the housing 100. In addition, the stator 300 may be disposed outside the rotor 400. That is, the rotor 400 may be rotatably disposed inside the stator 300.

Referring to FIG. 2 and FIG. 3, the stator 300 may include a stator core 310, coils 320 wound around the stator core 310, and an insulator 330 disposed between the stator core 310 and the coils 320.

The coils 320 which generate a rotating magnetic field may be wound around the stator core 310. In this case, the stator core 310 may be formed as one core or formed by coupling a plurality of divided cores.

In addition, the stator core 310 may be formed in a form in which a plurality of thin steel plates are stacked but is not necessarily limited thereto. For example, the stator core 310 may also be formed as one single part.

The stator core 310 may include a yoke (not shown) having a cylindrical shape and a plurality of teeth (not shown) protruding from the yoke in the radial direction. In addition, the coils 320 may be wound around the teeth.

The insulator 330 insulates the stator core 310 from the coils 320. Accordingly, the insulator 330 may be disposed between the stator core 310 and the coils 320.

Accordingly, the coils 320 may be wound around the teeth of the stator core 310 on which the insulator 330 is disposed.

The rotor 400 may be disposed inside the stator 300. In addition, the shaft 500 may be coupled to a central portion of the rotor 400.

The rotor 400 may include a rotor core 410 and a magnet 420. For example, the rotor 400 may be configured in a surface permanent magnet (SPM) type in which the magnet 420 is disposed on an outer circumferential surface of the rotor core 410.

Therefore, the magnet 420 may generate a rotation magnetic field with a coil 320 wound around the stator 300. The magnet 420 may be disposed so that N and S poles are alternately positioned in a circumferential direction with respect to the shaft 500.

Therefore, the rotor 400 is rotated by the electrical interaction between the coil 320 and the magnet 420, and the shaft 500 rotates in conjunction with the rotation of the rotor 400 to generate a driving force of the motor 1.

Meanwhile, the rotor core 410 of the rotor 400 may be manufactured by coupling a plurality of split cores or may be manufactured in a form of a single core formed as one barrel. For example, the rotor core 410 may be implemented in a shape in which a plurality of circular thin steel plates are stacked.

As shown in FIGS. 2 and 3, the shaft 500 may be rotatably supported by the bearing 10. In addition, the shaft 500 may rotate together in conjunction with the rotation of the rotor 400.

The bus bar 600 may be disposed above the stator 300. In addition, the bus bar 600 may be electrically connected to the coil 320 of the stator 300.

The bus bar 600 may include a bus bar body 610 and a plurality of bus bar terminals 620 disposed on the bus bar body 610.

The bus bar body 610 may be a molded product made of an insulating material through injection molding. In addition, the bus bar body 610 may be formed in a circular shape.

The bus bar terminal 620 may be disposed on the bus bar body 610 through injection molding. In this case, the bus bar terminal 620 may be formed on the bus bar body 610 so that a portion thereof is exposed.

In addition, one side of the bus bar terminal 620 may be electrically connected to the coil 320 of the stator 300. In addition, the other side of the bus bar terminal 620 may be formed to protrude upward to pass through the cover 200. Therefore, the other side of the bus bar terminal 620 may be electrically connected to a power terminal 720 of the connector 700 through fusing.

The connector 700 may be disposed at an upper portion of the cover 200 and coupled to the cover 200 through the fastening member 800, such as a bolt.

Therefore, there is an advantage in that a grounding structure between the shield terminal 730 and the cover 200 can be naturally implemented in a process of assembling the connector 700 to the cover 200.

The connector 700 may include a connector body 710, and a plurality of power terminals 720 and a shield terminal 730 that are disposed on the connector body 710. Here, the shield terminal 730 may be referred to as a ground terminal.

Therefore, the connector 700 may transmit power applied from the outside to the coil 320 using the power terminal 720.

The connector body 710 may be a molded product made of an insulating material. Here, the connector body 710 may serve as a frame that combines the power terminal 720 and the shield terminal 730 into one component.

The connector body 710 may include a body portion 711 and a connector portion 712. In addition, the body portion 711 and the connector portion 712 may be formed integrally.

The body portion 711 may be disposed at the upper portion of the cover 200.

The connector portion 712 may be formed to protrude from the body portion 711 in the axial direction. In addition, an external power source may be connected to the connector portion 712.

The power terminal 720 and the shield terminal 730 may be disposed on the connector body 710 through injection molding. In this case, portions of the power terminal 720 and the shield terminal 730 may be disposed to be exposed from the connector body 710.

The power terminal 720 may allow the power applied from the outside to be transmitted to the bus bar 600. Here, the power terminal 720 may be formed of a metal material.

An end portion of one side of the power terminal 720 may be disposed to face the other side of the bus bar terminal 620. In addition, the end portion of one side of the power terminal 720 may be electrically connected in contact with the bus bar terminal 620 through fusing or the like.

In addition, at least three power terminals 720 may be formed, and the power terminals 720 may be connected one-to-one to bus bar terminals 620 on U, V, and W.

The shield terminal 730 may be disposed in contact with the cover 200 to implement grounding. As shown in FIGS. 4, 7, and 8, an end portion of the shield terminal 730 disposed to be exposed from the connector body 710 may be in contact with the upper surface 211 of the cover body 210 to implement grounding.

In addition, the shield terminal 730 may be formed of an elastic material. Here, the elastic material may indicate a material that returns to an original state when a reaction force is removed and may be referred to as an elastic deformation material. In addition, the shield terminal 730 may be made of a metal material for grounding.

Figure 9:
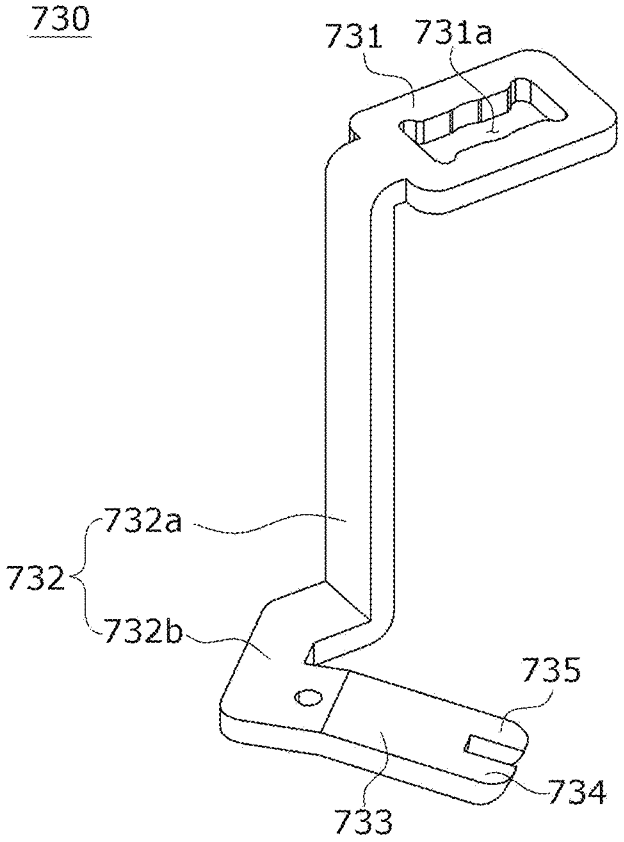
FIG. 9 is a perspective view showing a shield terminal disposed in the motor according to the embodiment.
Figure 10:
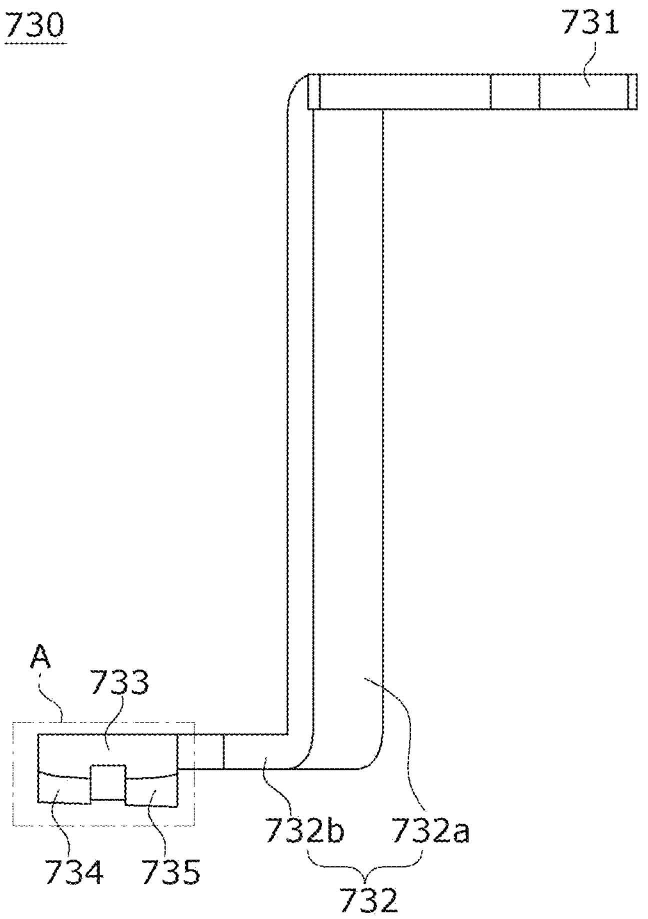
FIG. 10 is a front view showing the shield terminal disposed in the motor according to the embodiment.
Figure 11:
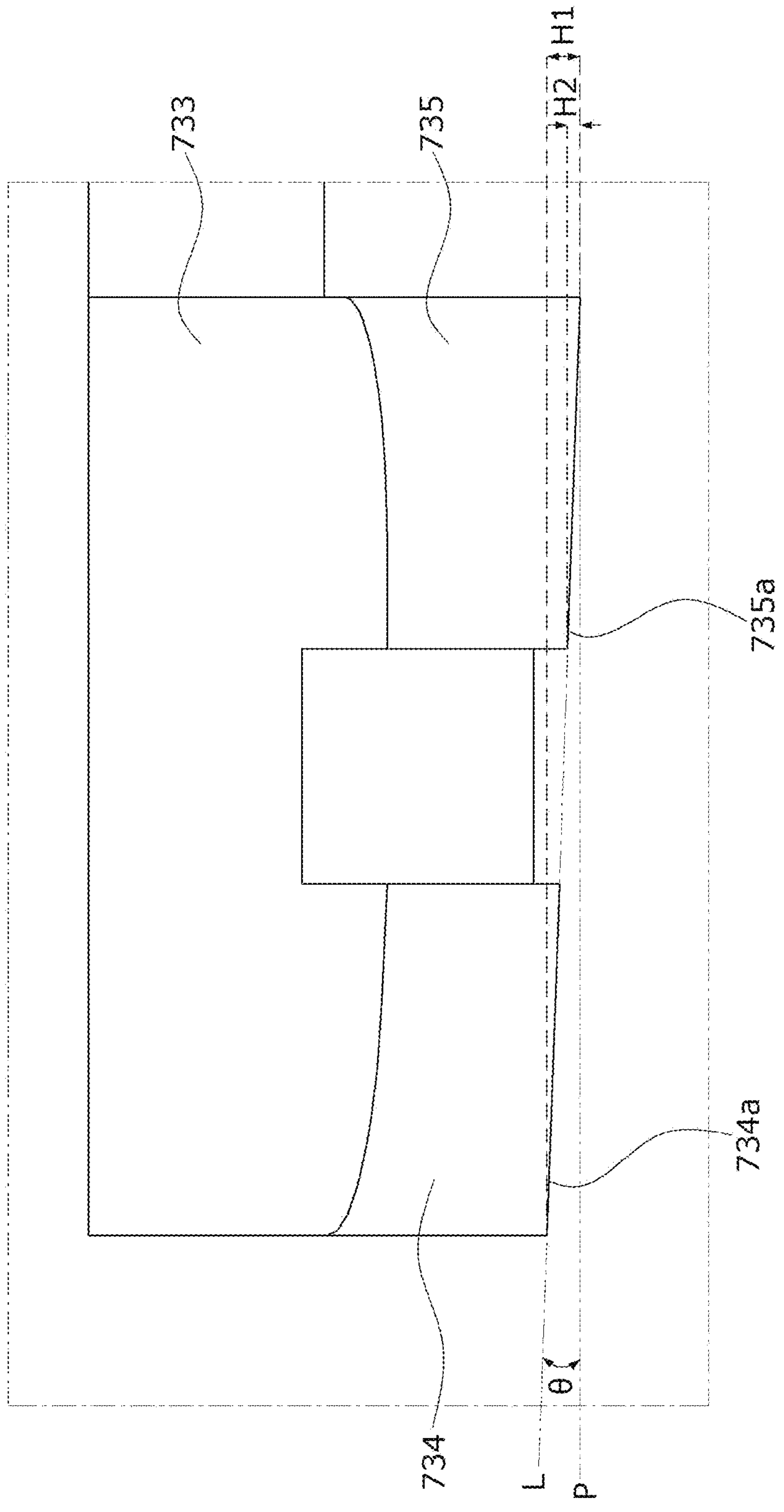
FIG. 11 is an enlarged view showing area A in FIG. 10.

FIG. 9 is a perspective view showing a shield terminal disposed in the motor according to the embodiment, FIG. 10 is a front view showing the shield terminal disposed in the motor according to the embodiment, and FIG. 11 is an enlarged view showing area A in FIG. 10.

Referring to FIGS. 9 to 11, the shield terminal 730 may include a plate-shaped plate part 731, a support 732 extending from one side of the plate part, an inclined part 733 extending to be inclined downward from an end portion of the support, and a first protrusion 734 and a second protrusion 735 formed to extend from an end portion of the inclined part 733. Here, the first protrusion 734 and the second protrusion 735 may be disposed to be spaced apart from each other.

In addition, the plate part 731, the support 732, the inclined part 733, the first protrusion 734, and the second protrusion 735 may be formed integrally. For example, the shield terminal 730 may be formed by cutting and partially bending one plate.

Therefore, when the connector 700 is coupled to the cover 200 using the fastening member 800, the first protrusion 734 and the second protrusion 735 are in contact with the upper surface 211 of the cover 200 to implement a grounding structure.

The plate part 731 may be formed in a plate shape, and a hole 731*a* may be formed in a central portion thereof. In addition, the hole 731*a* may be disposed to be exposed to a groove formed inside the connector portion 712. In addition, the plate part 731 may be disposed parallel to the upper surface 211.

The support 732 may be formed to extend from an outer surface of the plate part 731. In addition, the support 732 may be disposed inside the body portion 711 and the connector portion 712.

Therefore, even when an external force is applied to the plate part 731, the support 732 may support the plate part 731.

In addition, the support 732 may support the inclined part 733 to allow the first protrusion 734 and the second protrusion 735 to be positioned at preset positions. Therefore, it is possible to prevent incomplete contact between the first protrusion 734 and the second protrusion 735 due to an assembly tolerance or the like.

Referring to FIG. 9, the support 732 may include a first area 732*a* and a second area 732*b*.

The first area 732*a* may be formed to extend downward from the outer surface of the plate part 731. Specifically, the first area 732*a* may be formed to extend in a vertical direction from the outer surface of the plate part 731. In this case, the first area 732*a* may be formed in a plate shape.

In addition, the first area 732*a* may be disposed inside the connector portion 712. Therefore, even when an external force is applied to the plate part 731, the first area 732*a* may support the plate part 731.

The second area 732*b* may extend in the horizontal direction from an end portion of a lower side of the first area 732*a*. In this case, the second area 732*b* may be formed in a plate shape.

In addition, the second area 732*b* may be disposed inside the body portion 711. Therefore, even when a reaction force is generated from the inclined part 733, the second area 732*b* may support the inclined part 733.

The inclined part 733 may be formed to be inclined downward from an end portion of the second area 732*b* of the support 732. Therefore, the inclined part 733 can implement an elastic structure. Here, the inclined part 733 may be formed in a plate shape.

The first protrusion 734 and the second protrusion 735 may be disposed to be spaced apart from each other at the end portion of the inclined part 733. Here, although an example in which the motor 1 has two protrusions is described, the present invention is not limited thereto. For example, the motor 1 may include two or more protrusions. However, the motor 1 can implement two-point contact with the cover 200 by applying at least two protrusions to the shield terminal 730. Therefore, it is possible to increase the grounding ability of the motor 1.

Therefore, the first protrusion 734 and the second protrusion 735 that are formed on the shield terminal 730 can prevent the shield terminal 730 from being in incomplete contact with the cover 200 due to an assembly tolerance or the like.

The first protrusion 734 may protrude and extend from the end portion of the inclined part 733. In this case, the first protrusion 734 may protrude in the same direction as the protruding direction of the inclined part 733. In addition, an end of the first protrusion 734 may be in contact with the upper surface 211 of the cover 200.

The second protrusion 735 may protrude and extend from the end portion of the inclined part 733. In this case, the second protrusion 735 may protrude in the same direction as the protruding direction of the inclined part 733.

In addition, the second protrusion 735 may be disposed to be spaced apart from the first protrusion 734. Specifically, the second protrusion 735 may be disposed to be spaced apart from the first protrusion 734 in a width direction of the inclined part 733.

In addition, an end of the second protrusion 735 may be in contact with the upper surface 211 of the cover 200.

Meanwhile, since an elastic structure is formed by the inclined part 733 and the cover 200 of the motor 1 is supported by the housing 100, a reaction force may be generated from the first protrusion 734 and the second protrusion 735 by contact with the cover 200.

In addition, the upper surface 211 of the cover 200 may be worn by the reaction forces and vibrations caused by driving the motor 1.

In addition, the wear may act as resistance to the ground of the cover 200 and the shield terminal 730, thereby degrading the performance of the motor 1.

Therefore, since the motor 1 may form the shield terminal 730 so that the first protrusion 734 and the second protrusion 735 have a height difference, it is possible to reduce an increase in resistance due to wear.

Referring to FIG. 11, the first protrusion 734 and the second protrusion 735 may be formed at the end portion of the inclined part 733 to have a predetermined height difference (H1–H2) with respect to a virtual plane. For example, the height H1 of the first protrusion 734 may be greater than the height H2 of the second protrusion 735 with respect to the plane. Here, the plane may be the upper surface 211 of the cover 200. In addition, the reference numeral "P" shown in FIG. 11 may denote the plane.

Therefore, a first reaction force generated from the first protrusion 734 differs from a second reaction force generated from the second protrusion 735 due to the height difference (H1–H2). For example, the first reaction force may be smaller than the second reaction force.

In addition, the amount of wear caused by the first protrusion 734 differs from the amount of wear caused by the second protrusion 735 depending on the difference in the reaction forces. For example, the amount of wear caused by the second protrusion 735 may be greater than the amount of wear caused by the first protrusion 734.

In addition, the difference in the amount of wear leads to a difference in the resistance due to the grounding of the first protrusion 734 and the resistance due to the grounding of the second protrusion 735.

Therefore, the motor 1 can increase the grounding power of the shield terminal 730 and the use period of the motor 1 through the first protrusion 734 and the second protrusion 735 that are formed to have a predetermined height difference (H1–H2).

In addition, a lower side end 734*a* of the first protrusion 734 and a lower side end 735*a* of the second protrusion 735 may be disposed on a virtual line L. In addition, a line L may have a predetermined inclination angle θ with respect to a plane P. Here, the end may be a lower side edge of each protrusion.

Therefore, by forming the shield terminal 730 so that the lower side end 734*a* of the first protrusion 734 and the lower side end 735*a* of the second protrusion 735 have the predetermined inclination angle θ with respect to the plane P, the motor 1 can secure a constant contact force between the first protrusion 734 and the second protrusion 735 even when the motor 1 is driven.

The fastening member 800 may couple the cover 200 with the connector 700. In this case, a load applied to the connector 700 by the fastening member 800 may allow the shield terminal 730 to be in close contact with the upper surface 211 of the cover 200.

Figure 12:
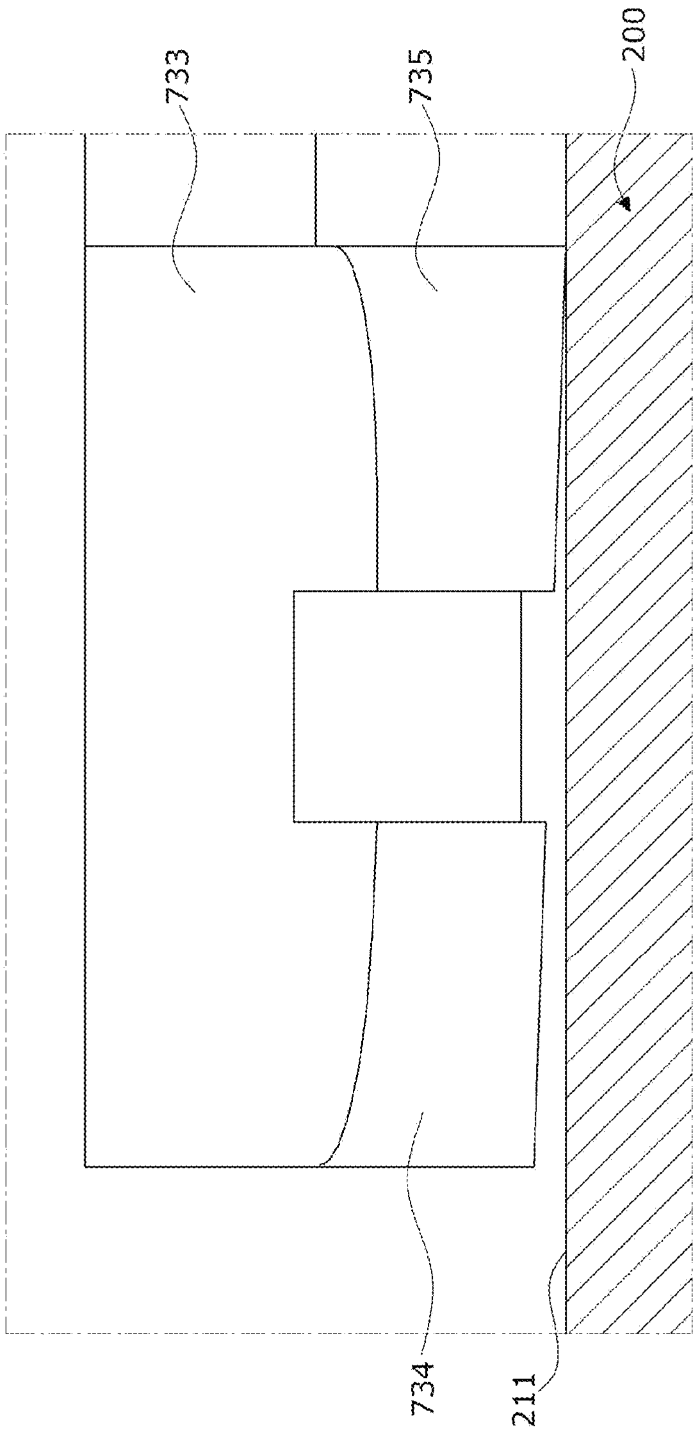
FIG. 12 is a view showing the arrangement relationship between the cover and the shield terminal before the cover and the connector that are disposed in the motor according to the embodiment are coupled.
Figure 13:
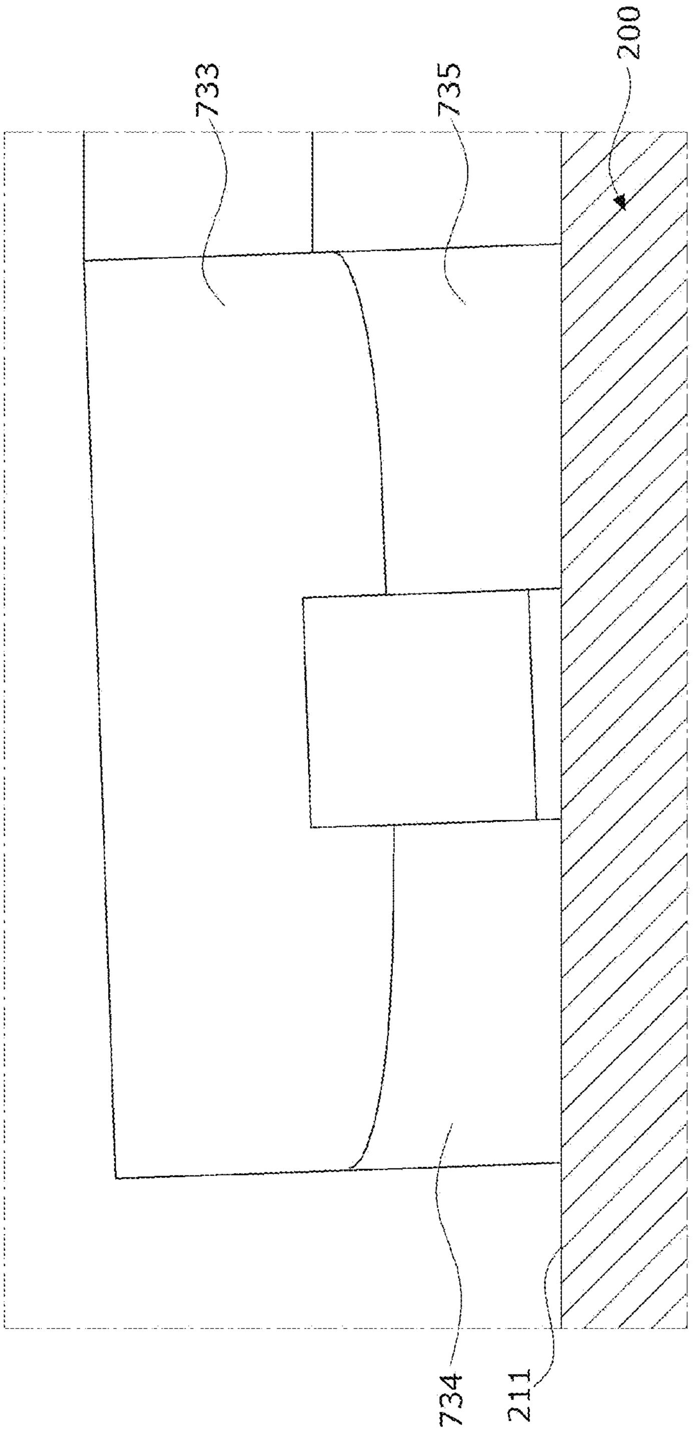
FIG. 13 is a view showing the arrangement relationship between the cover and the shield terminal after the cover and the connector that are disposed in the motor according to the embodiment are coupled.

FIG. 12 is a view showing the arrangement relationship between the cover and the shield terminal before the cover and the connector that are disposed in the motor according to the embodiment are coupled, and FIG. 13 is a view showing the arrangement relationship between the cover and the shield terminal after the cover and the connector that are disposed in the motor according to the embodiment are coupled.

Hereinafter, the contact relationship between the cover 200 and the shield terminal 730 will be described with reference to FIGS. 12 and 13.

As shown in FIG. 12, the second protrusion 735 of the shield terminal 730 is in contact with the cover 200 before the first protrusion 734 due to the height difference (H1–H2).

As shown in FIG. 13, the load applied to the connector 700 by the fastening member 800 causes the first protrusion 734 to be in contact with the cover 200.

Therefore, since the motor 1 implements the two-point contact structure through the first protrusion 734 and the second protrusion 735, it is possible to increase the grounding power and grounding retention of the shield terminal 730 when the motor 1 is driven.

In addition, the motor 1 may easily respond to the wear through the first protrusion 734 and the second protrusion 735 formed to have the height difference (H1–H2). Therefore, it is possible to increase the durability of the motor 1.

In other words, it is possible to increase the durability of the motor 1 and the grounding power of the shield terminal 730 through an optimized structural design of the shield terminal 730.

In the above-described embodiments, an outer rotor type motor has been described as an example, but the present invention is not limited thereto. The present invention may be also applied to inner rotor type motors. In addition, the motor may be used in any of various devices, such as vehicles or home appliances.

While the present invention has been described above with reference to the exemplary embodiments, it may be understood by those skilled in the art that various modifications and changes of the present invention may be made within a range not departing from the spirit and scope of the present invention defined by the appended claims.

DESCRIPTION OF REFERENCE NUMERALS

1: motor, 100: housing, 200: cover, 300: stator, 310: stator core, 320: coil, 330: insulator, 400: rotor, 500: shaft, 600: bus bar, 700: connector, 730: shield terminal, 800: fastening member

The invention claimed is:

1. A motor comprising:

a housing;

a cover disposed at an upper portion of the housing;

a stator inside the housing;

a rotor disposed inside the stator;

a shaft coupled to the rotor; and a connector disposed at an upper portion of the cover, wherein the connector includes a connector body, and a shield terminal disposed on the connector body, wherein the cover is made of a metal material, wherein the shield terminal includes a plate part, a support extending from one side of the plate part, an inclined part extending to be inclined from an end portion of the support, and a first protrusion and a second protrusion are in contact with the cover, wherein the first protrusion and the second protrusion protrude to be spaced apart from each other from an end portion the inclined part, and wherein the first protrusion and the second protrusion have a predetermined height difference.

2. The motor of claim 1, wherein the support is disposed inside the connector body.

3. The motor of claim 2, wherein the connector body includes a body portion disposed at the upper portion of the cover, and a connector portion formed to protrude in an axial direction from the body portion, wherein the support includes a first area formed to extend downward from an outer surface of the plate part, and a second area extending in a horizontal direction from a lower side end portion of the first area, wherein the first area is disposed inside the connector portion, and wherein the second area is disposed inside the body portion.

4. The motor of claim 2, wherein the plate part is formed in a plate shape and has a hole at the center.

5. The motor of claim 1, wherein the first protrusion and the second protrusion are in contact with an upper surface of the cover.

6. The motor of claim 1, wherein a lower side edge of the first protrusion and a lower side edge of the second protrusion are disposed on a virtual line (L), and wherein the virtual line (L) forms a predetermined inclination angle (θ) with respect to a virtual plane.

7. The motor of claim 6, wherein the virtual plane is provided as an upper surface of the cover.

8. The motor of claim 1, wherein the cover includes:

a cover body;

a first cover protrusion extending to protrude upward of axial directions from an outer circumference of the cover body; and a second cover protrusion extending to protrude downward of the axial directions from the cover body, and wherein a bearing is disposed inside the second cover protrusion.

9. The motor of claim 1, further comprising a bus bar disposed above the stator, wherein the bus bar includes a bus bar body and a plurality of bus bar terminals disposed on the bus bar body, and wherein an end portion of the bus bar terminal passing through the cover is electrically connected to a power terminal of the connector.

10. The motor of claim 9, wherein an end portion of one side of the power terminal is disposed to face and electrically connected to an end of the bus bar terminal.

11. A motor comprising:

a housing;

a cover disposed at an upper portion of the housing;

a stator inside the housing;

a rotor disposed inside the stator;

a shaft coupled to the rotor; and a connector disposed at an upper portion of the cover, wherein the connector includes a connector body, and a shield terminal disposed on the connector body, wherein the cover is made of a metal material, wherein the shield terminal includes a first protrusion and a second protrusion that are in contact with the cover, wherein a reaction force generated from the first protrusion differs from a reaction force generated from the second protrusion due to the contact with the cover, wherein the shield terminal includes a plate part, a support extending from one side of the plate part, and an inclined part extending to be inclined from an end portion of the support, and wherein the first protrusion and the second protrusion protrude to be spaced apart from each other from an end portion of the inclined part.

12. The motor of claim 11, wherein, with respect to a virtual plane, the first protrusion and the second protrusion are disposed on the inclined part of the shield terminal to have a predetermined height difference.

13. The motor of claim 12, wherein a lower side edge of the first protrusion and a lower side edge of the second protrusion are disposed on a virtual line (L), and wherein the virtual line (L) forms a predetermined inclination angle (θ) with respect to the virtual plane.

14. The motor of claim 11, wherein the connector body includes a body portion disposed at the upper portion of the cover, and a connector portion formed to protrude in an axial direction from the body portion, wherein the support includes a first area formed to extend downward from an outer surface of the plate part, and a second area extending in a horizontal direction from a lower side end portion of the first area, wherein the first area is disposed inside the connector portion, and wherein the second area is disposed inside the body portion.

15. The motor of claim 11, wherein the plate part is formed in a plate shape and has a hole at the center.

* * * * *